Oct. 7, 1941.     G. J. MEYER     2,258,063
WATER FILTER
Filed May 4, 1939
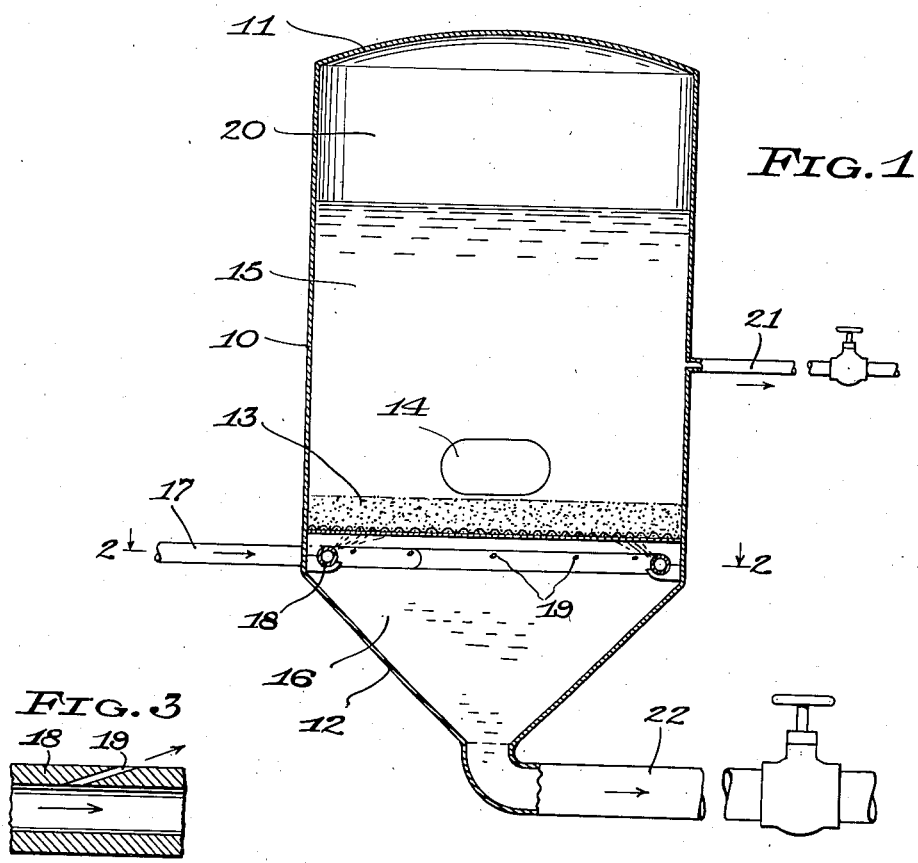
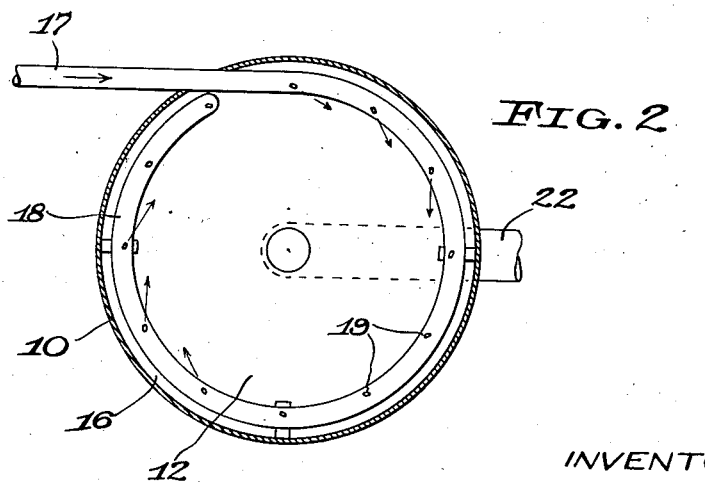
WITNESSES
L. E. Kilian
C. L. Naal
INVENTOR
GEORGE J. MEYER
BY
R. H. Caldwell
ATTORNEY Patented Oct. 7, 1941

2,258,063

UNITED STATES PATENT OFFICE 2,258,063

WATER FILTER

George J. Meyer, Milwaukee, Wis.

Application May 4, 1939, Serial No. 271,652

2 Claims. (Cl. 210—140)

The present invention relates to water filters and more particularly to the type in which the water to be purified is passed upwardly through a filter body.

An object of the invention is to provide an improved water filter of this general type having simple but effective means for cleaning the filter body and for washing away sediment or sludge.

The invention further consists in the several features hereinafter described and claimed.

In the accompanying drawing, illustrating one specific embodiment of the invention, Fig. 1 is a sectional elevation of a water filter constructed in accordance with the invention;

Fig. 2 is a sectional view thereof taken generally along the line 2—2 of Fig. 1, and Fig. 3 is a detail sectional view of a distributing pipe for the filter.

In the drawing, 10 designates an upright cylindrical casing having a top wall 11 and a downwardly converging conically formed bottom wall 12. A filter bed or body 13 is suitably carried in the casing and is accessible through a normally closed opening 14 in the side wall of the casing, the filter body dividing the casing into upper and lower compartments 15 and 16, and the lower compartment 16 forming a sediment chamber. An inlet conduit 17 projects tangentially into the casing a short distance below the filter body and preferably includes an extension in the form of a suitably supported curved dead-ended distributing pipe 18, Fig. 2, which lies horizontally below the filter body near the side walls of the casing and is approximately concentric with the casing. The curved distributing pipe 18 is provided with a series of small inclined openings 19 for producing tangential water jets in a forward and upward direction, so as to induce a swirling motion of the water in the compartment 16, the action being to clean the bottom of the filter body and the walls of this compartment, as hereinafter more fully set forth.

The compartment 15 above the filter body forms a reservoir for filtered water and preferably includes a compressed air space 20 above the water, so as to provide for flushing of the filter body by the return flow of filtered water, as is well understood in this art. A valved outlet conduit 21 for filtered water is connected to the casing above the filter body.

The bottom of the sediment chamber 16 is connected to a valved outlet conduit 22 which can be used to supply unfiltered water for various purposes, such as flushing toilets, sprinkling, and boiler feeding, these uses not requiring filtered water. The outlet conduit 22 is relatively large in cross-section compared with the aggregate cross-sectional area of the openings 19 in the distributing pipe 18, so as to permit a substantial reduction in pressure in the sediment chamber when water is withdrawn through this conduit.

In operation, raw water is admitted under pressure through the inlet conduit 17 and its distributing pipe 18 to the sediment chamber 16, filling this chamber and passing upwardly through the filter body 13 into the compartment 15, the filtered water rising in this compartment above the outlet 21 and compressing the air in the air space 20 until the air pressure balances the water pressure. When filtered water is desired for drinking or other purposes it is withdrawn through the outlet conduit 21, the rate of flow being preferably limited so as to minimize disturbance of the filter body. When raw water is desired it is withdrawn through the bottom outlet 22. This lowers the pressure in the sediment chamber 16, and as a result the compressed air above the filtered water in the casing forces the filtered water downwardly through the filter body, thereby flushing or washing the filter body. This reduction of pressure also causes upwardly inclined tangential jets of water to issue from the small openings 19 in the distributor pipe 18 for inducing a swirling motion of the water below the filter body, thereby scouring or cleaning the bottom of the filter body and the sloping walls of the sediment chamber and washing down the sediment or sludge into the outlet conduit 22. This scouring and wash-down effect occurs automatically every time water is withdrawn through the outlet 22. When the outflow of raw water is stopped, the incoming raw water continues to flow but at a reduced rate, and rises through the filter body until the air pressure above the filtered water balances the pressure in the inlet conduit.

The filter of the invention is particularly suitable for domestic and factory use, and is not only simple and reliable in operation but is also capable of inexpensive manufacture.

What I claim as new and desire to secure by Letters Patent is:

1. A filter comprising a casing having an upflow filter body therein and having a sediment chamber below said body, said casing being provided with an outlet for filtered water and inlet means for admitting water under pressure to said chamber and including a distributing pipe extending around the upper portion of said chamber, said pipe having a series of jet openings spaced therealong and each extending forwardly in a generally tangential direction with respect to the periphery of the chamber, whereby the water jets issuing from the openings will induce a swirling motion of the water in said chamber to scour the bottom of said filter body.

2. A filter comprising a casing having an upflow filter body therein and having a sediment chamber below said body, said casing being provided with an outlet for filtered water and said chamber having peripheral walls and being of generally circular shape in horizontal cross-section, and inlet means for admitting water under pressure to said chamber and having a series of jet openings at the upper portion of said chamber and adjacent to said peripheral walls, said openings being spaced around said chamber and extending in a generally tangential direction with respect to said walls, whereby the jets issuing from said openings will cause a circular scouring travel of the water along the bottom of said filter body.

GEORGE J. MEYER.